US008310342B2

(12) United States Patent
Yang et al.

(10) Patent No.: US 8,310,342 B2
(45) Date of Patent: Nov. 13, 2012

(54) IDENTIFICATION ANTI-COLLISION METHOD AND RADIO FREQUENCY IDENTIFICATION SYSTEM USING THE SAME

(75) Inventors: Jin-young Yang, Seoul (KR); Sunshin An, Seoul (KR); Woo-shik Kang, Suwon-si (KR); Ji-hun Koo, Yongin-si (KR); Young-hwan Jung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1551 days.

(21) Appl. No.: 11/444,341

(22) Filed: Jun. 1, 2006

(65) Prior Publication Data
US 2006/0273881 A1    Dec. 7, 2006

(30) Foreign Application Priority Data
Jun. 1, 2005   (KR) .......................... 10-2005-0046781

(51) Int. Cl.
*H04Q 5/22* (2006.01)
(52) U.S. Cl. ................. 340/10.2; 340/10.32; 340/10.42; 340/10.1; 340/572.1

(58) Field of Classification Search ................. 340/10.2, 340/10.32, 10.1, 572.1, 7.46, 10.42; 714/748, 714/750
See application file for complete search history.

(56) References Cited

U.S. PATENT DOCUMENTS

| 5,323,149 | A | * | 6/1994 | Hoult et al. .................. 340/10.2 |
| 5,530,437 | A | * | 6/1996 | Goldberg ..................... 340/7.23 |
| 5,841,770 | A | * | 11/1998 | Snodgrass et al. ............ 370/346 |
| 7,425,888 | B2 | * | 9/2008 | Powell .......................... 340/10.2 |
| 2002/0180587 | A1 | * | 12/2002 | Stegmaier et al. ........... 340/10.1 |

* cited by examiner

*Primary Examiner* — Edwin Holloway, III
(74) *Attorney, Agent, or Firm* — Sughrue Mion, PLLC

(57) ABSTRACT

An anti-collision method is provided for a radio frequency identification (RFID) system including a reader, and two or more tags each having an ID. The anti-collision method includes transmitting an ID request value from the reader to the respective tags, the ID request value containing one or more of the codes forming the ID, receiving the ID from at least one of the tags which contain the ID request value, when a plurality of IDs collide, requesting the tags for a value representing a position of collision, and receiving the value representing the position of collision from the tags and identifying the IDs of the tags. Because collision pattern of the bits of respective IDs is recognized, and a plurality of IDs are recognized, the number of transmissions between the reader and the tags can be reduced.

20 Claims, 6 Drawing Sheets

| Prefix Queue Initially 0,1 | | | | | 1011010 1000010 1010000 | | 1000010 1010000 | | 1000010 1010000 | | 1010000 | | |
|---|---|---|---|---|---|---|---|---|---|---|---|---|---|
| Downlink (Reader->Tag) | REQUEST VALUE 0 | 1st iteration | REQUEST VALUE 1 | 2nd iteration | CBP VALUE 1 00110101 | 3rd iteration | REQUEST VALUE 1011010 | 4th iteration | CBP VALUE 1011010 00000001 | 5th iteration | REQUEST VALUE 1000010 | 6th iteration | REQUEST VALUE 1010000 | 7th iteration |
| Uplink (Tag->Reader) | | No response | | 10XX0X0X | | X00X0X10 | | 1011010X | | 000000XX identified 10110101 10110100 | | 10000100 identified | | 10100001 identified |
| Tag1 10110101 | | | | 10110101 | | 10000000 (111) | | 10110101 | | 00000010 (1) | | | | |
| Tag2 10110100 | | | | 10110100 | | 10000000 (111) | | 10110100 | | 00000001 (0) | | | | |
| Tag3 10000100 | | | | 10000100 | | 00000010 (001) | | | | | | 10000100 | | |
| Tag4 10100001 | | | | 10100001 | | 00010000 (100) | | | | | | | | 10100001 |

FIG. 2

| Prefix Queue Initially 0,1 | REQUEST VALUE 0 | 1st iteration | REQUEST VALUE 1 | 2nd iteration | CBP VALUE 00110101 | 3rd iteration | REQUEST VALUE 1011010 | 4th iteration | CBP VALUE 1011010 00000001 | 5th iteration | REQUEST VALUE 1000010 | 6th iteration | REQUEST VALUE 1010000 | 7th iteration |
|---|---|---|---|---|---|---|---|---|---|---|---|---|---|---|
| Downlink (Reader→Tag) | | | | | | 1011010 1000010 1010000 | | 1000010 1010000 | | 1000010 1010000 | | 1010000 | | |
| Uplink (Tag→Reader) | | No response | | 10XXX0X0X | | X00X0X10 | | 1011010X | | 000000XX identified 10110101 10110100 | | 10000100 identified | | 10100001 identified |
| Tag1 10110101 | | | | 10110101 | | 10000000 (111) | | 10110101 | | 00000010 (1) identified | | | | 10100001 |
| Tag2 10110100 | | | | 10110100 | | 10000000 (111) | | 10110100 | | 00000001 (0) | | | | |
| Tag3 10000100 | | | | 10000100 | | 00000010 (001) | | | | | | 10000100 | | |
| Tag4 10100001 | | | | 10100001 | | 00010000 (100) | | | | | | | | 10100001 |

IDENTIFICATION ANTI-COLLISION METHOD AND RADIO FREQUENCY IDENTIFICATION SYSTEM USING THE SAME

CROSS-REFERENCE TO RELATED APPLICATIONS

This application claims priority from Korean Patent Application No. 10-2005-0046781 filed on Jun. 1, 2005 in the Korean Intellectual Property Office, the entire disclosure of which is incorporated herein by reference.

BACKGROUND OF THE INVENTION

1. Field of The Invention

Methods and apparatuses consistent with the present invention relate to identification (ID) anti-collision and radio frequency identification (RFID) systems. More particularly, the present invention relates to an anti-collision method using a collision bit determination and a RFID system thereof.

2. Description of The Prior Art

RFID technology reads out information from the tags attached to objects via radio waves. RFID is applied to various fields such as product distribution management, security, delivery, and so on. Contact barcode system is replaced by RFID which can read out information much faster. RFID provides advantages such as wide range of operation, and product intelligence.

In a ubiquitous computing environment, multiple tags may come into a reading range of a reader. When the tags respond to a request of the reader at the same time, signals from the tags interfere and collide with one another.

An anti-collision algorithm is adopted to resolve interference between the reply signals of the tags to allow collision-free recognition of the replies from the tags.

Many anti-collision algorithms have been proposed. In one anti-collision algorithm, for example, a binary ID can be provided to a tag so that tags with unintended IDs are eliminated from the consideration. This will be explained briefly below.

First, a (n)-bit binary ID is provided to a tag, and a reader transmits ID request signal to a plurality of tags. The ID request signal includes a '0' or '1' binary ID request value. Upon receiving the ID request signal, each tag compares the ID request value with the first bit of its own ID, and if the data match, transmits its ID to the reader. For example, all the tags with IDs starting with '1', transmit their IDs to the reader in response to '1' ID request value. Likewise, all the tags with IDs starting with '0' transmit their IDs to the reader in response to '0' ID request value.

If one tag responds to the ID request signal, the responding tag is confirmed to be the tag desired by the reader. If more than one tag responds to the reader and first bits of the IDs collide against each other, the reader transmits '0' or '1' binary ID request signal with respect to the next bits of the tag IDs. The reader resets non-responding tags, and thus removes the non-responding tags from the consideration.

If more than one tag responds to the second ID request signal again, the reader transmits another ID request signal with respect to next bits of the IDs. This process repeats until only one tag responds to the ID request signal.

As explained above, conventionally, the reader repeatedly generates and transmits one-bit ID request signal when more than one tags respond. Therefore, it becomes problematic when the collision IDs are composed of many bits because much time is consumed. Additionally, the tags transmit their entire IDs rather than the bits of interest, thereby increasing power consumption.

Therefore, an RF system which operates with requiring reduced time and power, is necessary.

SUMMARY OF THE INVENTION

The invention provides an ID anti-collision method using a collision bit determination and an RFID system using the same.

According to an aspect of the invention, there is provided an anti-collision method of an RFID system comprising a reader, and two or more tags each having an ID, respectively. The anti-collision method includes transmitting an ID request value from the reader to the respective tags, the ID request value containing one or more of the codes forming the ID, receiving the ID from at least one of the tags which contain the ID request value, when a plurality of IDs collide, requesting the tags for a value representing a position of collision, and receiving the value representing the position of collision from the tags and identifying the IDs of the tags.

The ID comprises a binary bit, and in the transmitting the ID request value, '0' or '1' is transmitted.

When the IDs collide with each other, the reader recognizes the position of collision based on a code other than the binary bit.

The requesting the value representing the position of collision of the IDs comprises the step of generating a collision bit position (CBP) value, which indicates the position of collision ID based on a predetermined code, and transmitting the generated CBP value to the tags.

The requesting the value representing the position of collision of the IDs comprises the step of transmitting the ID request value.

The generating a collision bit determination request (CBDreq), which is a collection of consecutive bits representing the position of collision of each of the tags, may also be provided.

In the generating the CBDreq, bits representing the position of collision are converted to a decimal unit, and the CBDreq which indicates the position corresponding to the converted decimal value based on binary data '0' or '1', is generated.

The CBDreq is transmitted as many as a predetermined number of codes.

The identifying the IDs comprises putting the CBDreq in sequence into the position of. collision when the CBDreq is equal to, or smaller than the predetermined number of bits.

The identifying the IDs comprises generating an estimate ID, by putting the CBDreq in sequence into the position of collision when the CBDreq is greater than the predetermined number of bits; and transmitting the estimate ID to the respective tags as the ID request value.

The confirming an ID may also be provided, when the estimate ID as the ID request value does not have any collision.

If the estimate ID as the ID request value has a collision, the re-generating the CBP value with respect to the position of collision and transmitting the re-generated CBP value and the estimate ID to the colliding tag, may also be provided.

According to another aspect of the present invention, there is provided an RFID system comprising a reader and two or more tags having IDs, wherein, the tags each provides ID in response to a request from the reader, and when colliding with IDs of the other tags, provides the reader with a value representing the position of collision of the ID, and the reader transmits to each of the tags an ID request value which contains at least one of codes forming the ID, receives the ID from each of the tags, and when the tags collide with each other, receives from each of the tags a value representing the position of collision and identifies the IDs.

BRIEF DESCRIPTION OF THE DRAWING FIGURES

The above and/or other aspects of the invention will become apparent and more readily appreciated from the following description of exemplary embodiments, taken in conjunction with the accompanying drawing figures of which:

FIG. 2 is a diagram illustrating an ID anti-collision method according to an exemplary embodiment of the present invention;

DETAILED DESCRIPTION OF EXEMPLARY EMBODIMENTS

Figure 1:
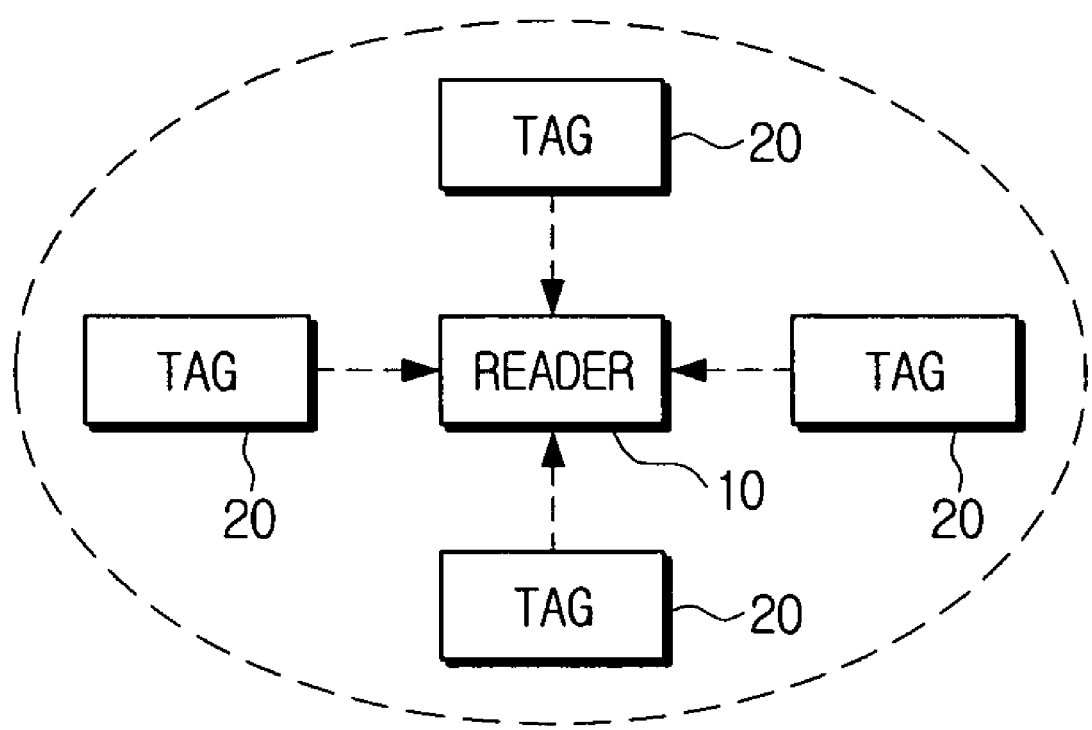
FIG. 1 is a diagram illustrating a construction of a radio frequency identification (RFID) system implementing an ID anti-collision method according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the invention in unnecessary detail.

FIG. 1 shows the structure of an RFID system which implements an ID anti-collision method according to an exemplary embodiment of the present invention. According to this exemplary embodiment, the RFID system includes a reader 10 and one or more tags 20.

The reader 10 is usually provided with a memory which stores therein binary ID request values to provide to the tags 20 upon request. The memory also stores IDs which are anticipated according to the collision bits of the IDs. The memory may be implemented as a stack or a queue, and in the following example, the queue is employed.

FIG. 2 depicts an ID anti-collision method according to an exemplary embodiment of the present invention.

According to this exemplary embodiment of the present invention, it is assumed that the reader 10 takes charge of tag1, tag2, tag3 and tag4. IDs of the tag1, tag2, tag3 and tag4 are '10110101', '10110100', '10000100', and '10100001', respectively, which are eight bits long.

With reference to the table shown in FIG. 2, the process of anti-collision method according to an exemplary embodiment of the present invention will be explained below.

In the row of 'Prefix Queue Initially 0, 1', values stored in the queue are indicated. The queue initially receives '0' and '1' and then stores anticipated IDs after the collision of IDs of the tags 20. The row of 'Downlink (Tag->Reader)' shows in sequence the ID request value which is transmitted from the reader 10 to the tags 20. The stored values of the queue are sequentially used as the ID request value. The row of 'Uplink' shows response IDs which are transmitted from the tags 20 to the reader 10, and the collision bits are marked as 'X'. The rows of 'Tag1', 'Tag2', 'Tag3', and 'Tag4' indicate the IDs of the respective tags which are identified through the processes of Downlink and Uplink.

Descriptions will now be made on how the reader 10 recognizes and identifies the IDs of tag1, tag2, tag3 and tag4 according to the anti-collision method.

The reader 10 inputs '0' and '1' as the ID request value IDreq. That is, the reader 10 first outputs the ID request value '0' from the queue (the ID request value '0' of the queue is accordingly deleted from the queue), and transmits the ID request value '0' to the tags 20. The tags 20, upon receiving the ID request value '0', check whether the received ID request value '0' matches their IDs. That is, the tags 20 check whether their IDs start with '0'.

Next, tag1, tag2, tag3 and tag4, all of which start with '1', confirm that their IDs do not start with '0', and thus do not send any replies to the reader 10. When no replies are received from the tags 20 within a predetermined time, the reader 10 outputs the next ID request value '1'. The ID request value '1' is accordingly removed from the queue. The reader 10 transfers the ID request value '1' to the tags 20, and the tags 20 check whether the received request value '1' matches their IDs. That is, the tags 20 check whether their IDs start with '1'.

Tag1, tag2, tag3 and tag4 confirm that their IDs start with '1', and thus transfer their IDs '10110101', '10110100', '10000100', and '10100001' to the reader 10.

When the transferred IDs do not collide with one another, the reader 10 can identify all of tag1, tag2, tag3 and tag4 based on the received IDs.

However, in this particular example, the bits '1' at the same bit positions of the respective IDs collide with one another. More specifically, tag1 has the bit '1' in the third, fourth, sixth and eighth bit positions of the ID, tag2 has the bit '1' in the third, fourth, and sixth bit position of the ID, tag3 has the bit '1' in the sixth order of the ID, and tag4 has the bit '1' in the third and the eighth bit position of the ID. Therefore, the third, fourth, sixth and eighth bits of the respective IDs collide with one another. The reader 10 recognizes the collision bits as 'X', and therefore, an ID may be recognized as '10XX0X0X'.

The reader 10 then generates collision bit position (CBP) value using the IDs which are bit-wise recognized as explained above. The CBP value is used to request the transfer of the collision bits among the bits of the tag IDs.

The CBP value indicates a collision bit, which is recognized by the reader 10 as 'X', as '1', and a non-collision bit as '0'. Accordingly, when the reader 10 recognizes the collision ID bits as '10XX0X0X', '00110101' will be generated as the CBP value.

Next, the reader 10 transfers the ID request value '1', which induced the ID collision, and the CBP value '00110101' to the tags 20. Upon receiving the ID request value '1' and the CBP value '00110101', the tags 20 check whether the ID request value '1' matches their IDs. When the ID request value '1' matches their IDs, the tags 20 generate a collision bit determination value CBDreq from the CBP value '00110101'.

The CBDreq is a collection of the collision bits of the ID. Specifically, the tag1 generates the collision bits '1111' based on the received CBP value, the tag2 generates the collision bits '1110' based on the CBP value, the tag3 generates the collision bits '0010' based on the CBP value, and the tag4 generates the collision bits '1001' based on the CBP value.

The number of bits that the tags 20 can transmit to the reader 10 as the CBDreq may be predetermined. If it is predetermined such that the tags 20 can transmit three bits as the CBDreq, for example, each of the tags 20 transfers the first three bits of the CBDreq, while excluding the last bit.

Therefore, the tags 20 transfer the generated CBDreq '111', '111', '001', and '100', respectively. The tags 20 may convert the CBDreq to another binary values to prevent collision among the CBDreq.

Because there are three bits of CBDreq in this exemplary embodiment, the CBDreq, when expressed in a decimal basis, will be one of integers 0 to 7. In other words, the CBDreq of the tag1 and the tag2 may be expressed as '7', CBDreq of the tag3 may be expressed as '1' and the CBDreq of the tag4 may be expressed as '4'.

In binarizing the CBDreq, eight binary codes are generated from the eight CBDreq (0~7) so that decimal value is expressed by '0' or '1'.

For example, when the CBDreq is '0' in a decimal basis, the binary code '00000000' may be set. When the CBDreq is '1' in a decimal basis, the binary code '00000010' may be set. When the decimal CBDreq is '2' in a decimal basis, the binary code '00000100' may be set. When the decimal CBDreq is '3' in a decimal basis, the binary code '00001000' may be set. When the decimal CBDreq is '4' in a decimal basis, the binary code '00010000' may be set. When the decimal CBDreq is '5' in a decimal basis, the binary code '00100000' may be set. When the decimal CBDreq is '6' in a decimal basis, the binary code '01000000' may be set. When the decimal CBDreq is '7' in a decimal basis, the binary code '10000000' may be set.

Because the CBDreq '111' of the tag1 is expressed as '7' in a decimal basis, the binary code '10000000' is transferred. Because the CBDreq '111' of the tag2 is expressed as '7' in a decimal basis, the binary code '10000000' is transferred.

Because the CBDreq '001' of the tag3 is expressed as '1' in a decimal basis, the binary code '00000010' is transferred. Because the CBDreq '100' of the tag4 is expressed as '4' in a decimal basis, the binary code '00010000' is transferred.

Upon receipt of the CBDreq, the reader 10 estimates the IDs within an identifiable range, using the ID bits '10XX0X0X' as recognized by the collision, and the received CBDreq. The reader 10 estimates the IDs by putting in order the received CBDreq in the 'X's of '10XX0X0X'.

By putting the received CBDreq '111', '001' and '100' into the 'X's, respectively, IDs '1011010', '1000010', and '1010000' are estimated. Because the CBDreq for the first three collision bits are provided from the respective tags 20, the IDs with seven bits, that is, the IDs excluding the last X, are estimated.

The reader 10 then stores the estimated IDs '1011010', '1000010', and '1010000' in the queue as the ID request values.

Therefore, when the ID request value is '1011010', every tag 20 having the ID starting with '1011010' transfers its ID to the reader 10.

The reader 10 outputs the first ID request value '1011010' among the ID request values generated and stored in the queue ('1011010' is accordingly removed from the queue). The reader 10 transfers the ID request value '1011010' to the tags 20, and the tags 20 check whether the received ID request value '1011010' matches their IDs. In other words, the tags 20 check whether their IDs start with '1011010'.

As a result, the tag1 and tag2 confirm that their IDs start with '1011010', and transfer their IDs '10110101' and '10110100' to the reader 10.

If the transferred IDs do not collide with each other, the reader 10 can identify both the tag1 and the tag2 using the received IDs.

However, in the exemplary embodiment of the present invention, the transferred IDs collide with each other at the reader 10, and the reader 10 recognizes the collision ID bits as 'X'. The collision ID can be then expressed as '1011010X'.

Accordingly, the reader 10 regenerates a CBP value from the collision IDs. As aforementioned, the CBP value is used to request the transfer of only collision bits of the tag ID.

The CBP value indicates the 'X' collision bit as '1', and the non-collision bit as '0'. Thus, when the collision recognized ID bits are '1011010X', CBP value '00000001' is generated.

The reader 10 then transfers the ID request value '1011010', which induced the ID collision, and the CBP value '00000001' to the tags 20. The tags 20, upon receiving them, check whether the ID request value '1011010' matches their IDs. When the ID request value '1011010' matches their IDs, the tags 20 generates a CBDreq from the CBP value '00000001'.

The CBDreq is a collection of collision bits in the ID. Specifically, the tag1 generates the CBDreq '1' based on the received CBP value, and the tag2 generates the CBDreq '0' based on the CBP value.

Likewise, when transferring the CBDreq, the number of bits that the tag1 and tag2 transmit to the reader 10 may be predetermined. As the CBDreq does no exceed the predetermined number of bits '3', the tag1 and tag2 transfers the CBDreq '1' and '0', respectively.

Since the CBDreq received from the tag1 and tag2 do not exceed the preset number of bits, the reader 10 can identify the IDs of the tag1 and tag2 as '10110101' and '10110100' based on the received CBDreq '1' and '0'.

The tag1 and tag2 may convert the CBDreq to binary values when transferring the CBDreq.

Specifically, since the CBDreq '1' of the tag1 is expressed as a decimal '1', a binary code '00000010' is transferred. Since the CBDreq '0' of the tag2 is expressed as a decimal '0', a binary code '00000000' is transferred.

After identifying the IDs of the tag1 and tag2, the reader 10 outputs the second ID request value '1000010'. At this time, the stored ID request value '1000010' is removed from the queue. The reader 10 transfers the ID request value '1000010' to the tags 20. The tags 20 check whether the received ID request value '1000010' matches their IDs. That is, the tags 20 check whether their IDs start with '1000010'.

As a result, the tag3 confirms that its ID starts with '1000010' and thus transfers its ID '10000100' to the reader 10.

The reader 10 identifies the ID of the tag3 '10000100' because the received ID has no collision.

After identifying the ID of the tag3, the reader 10 outputs the third ID request value '1010000'. At this time, the stored ID request value '1010000' is removed from the queue.

The reader 10 transfers the ID request value '1010000' to the tags 20. In response, the tags 20 check whether the received ID request value '1010000' matches their IDs. That is, the tags 20 check whether their IDs start with '1010000'.

Of tag1, tag2, tag3 and tag4, the tag4 confirms that its ID starts with '1010000' and thus transfers its ID '10100001' to the reader 10.

Since the transferred ID has no collision, the reader 10 can identify the ID of the tag4 '10100001'.

Figure 3A:
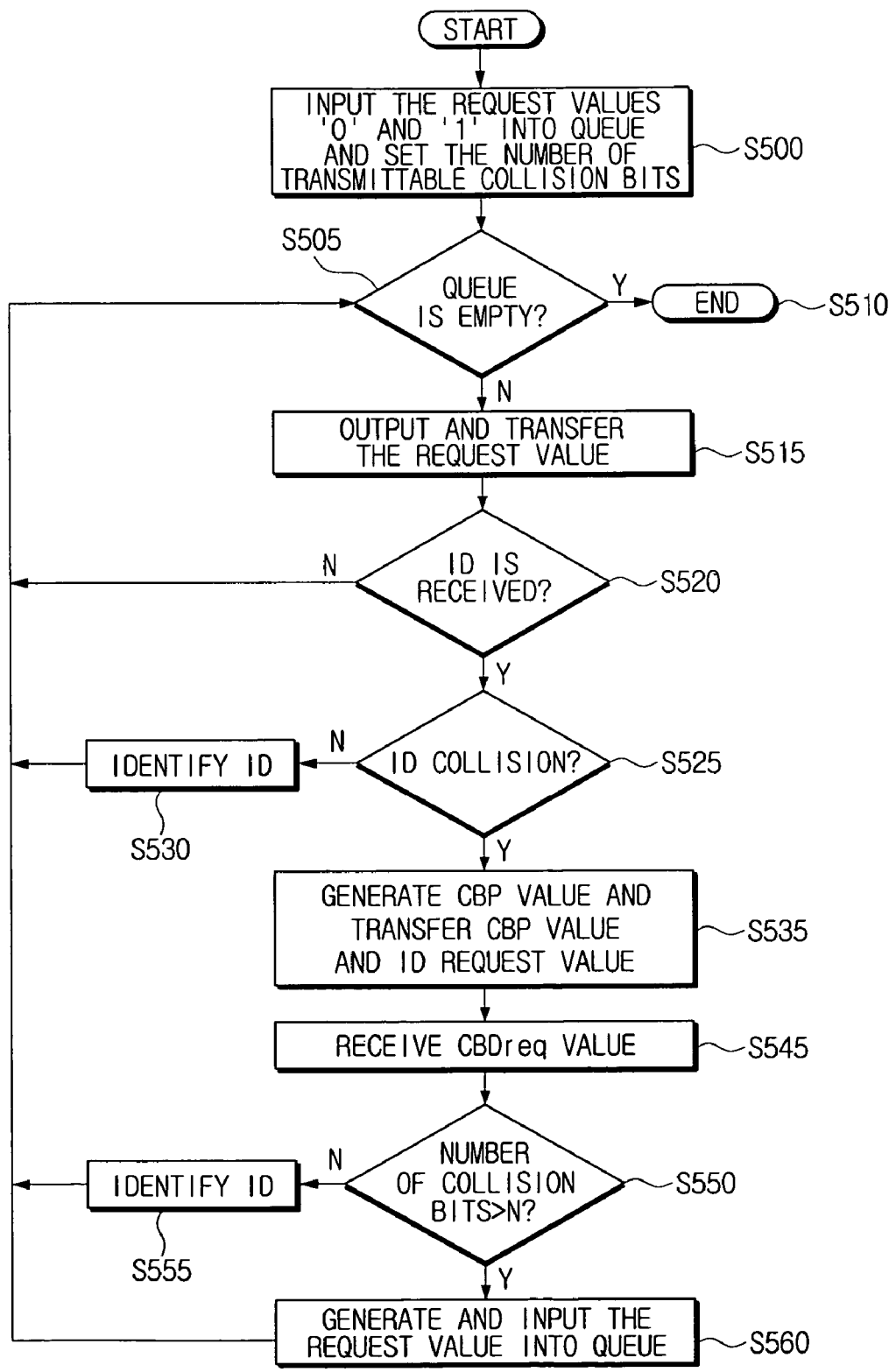
FIG. 3A is a flowchart illustrating an operation of a reader of the RFID system according to an exemplary embodiment of the present invention.

FIG. 3A is a flowchart illustrating an operation of a reader in the RFID system according to an exemplary embodiment of the present invention.

First, the reader 20 inputs the ID request values '0' and '1' into the queue and sets the number of collision bits transmittable from tags N (S500). Next, the reader 20 checks whether the queue is empty (S505). When the queue is empty, the tag ID identification is ended (S510).

When the queue is not empty, the reader 10 outputs and transfers the ID request value '0' in the queue, and requests the transfer of IDs that match the ID request value (S515). The ID request value '0', which has been input and stored in the queue, is removed from the queue upon the output from the queue.

The reader 20 checks whether IDs matching the ID request value '0' are received or not (S520). When no matching IDs are received, the reader 20 returns to operation S505 and checks whether the queue is empty. When the queue is not empty, the reader 10 outputs and transfers the stored ID request value '1', and thus requests the transfer of IDs matching the ID request value '1' (S515). At this time, the ID request value '1', which has been input and stored in the queue, is removed from the queue upon the output from the queue.

The reader 20 checks whether IDs matching the ID request value '1' are received or not (S520). When matching IDs are received, the reader 10 checks whether the received IDs have collision (S525).

When there is no collision in the received IDs, the reader 10 identifies the received tag IDs (S530) and returns back to operation S505.

When the received IDs collide, the reader 10 generates a CBP value and transfers the generated CBP value together with the ID request value (S535). Next, the reader 10 receives a CBDreq of the collision IDs (S545), and checks whether the number of collision bits is greater than the preset number of the transmittable collision bits N (S550).

When the number of collision bits is not greater than the preset number of the transmittable collision bits N, the reader 10 identifies the received ID based on the received CBP value (S555) and returns back to operation S505.

When the number of collision bits is greater than the preset number of the transmittable collision bits N, the reader 10 generates a new ID request value using the received CBDreq and stores the new ID request value in the queue (S560). Next, the reader 10 returns back to operation S505.

Ultimately, the reader 10 repeats operations S505 through S560 until there are no ID request values stored in the queue. When there are no ID request values left in the queue, the reader 10 can completely identify all the tag IDs.

Figure 3B:
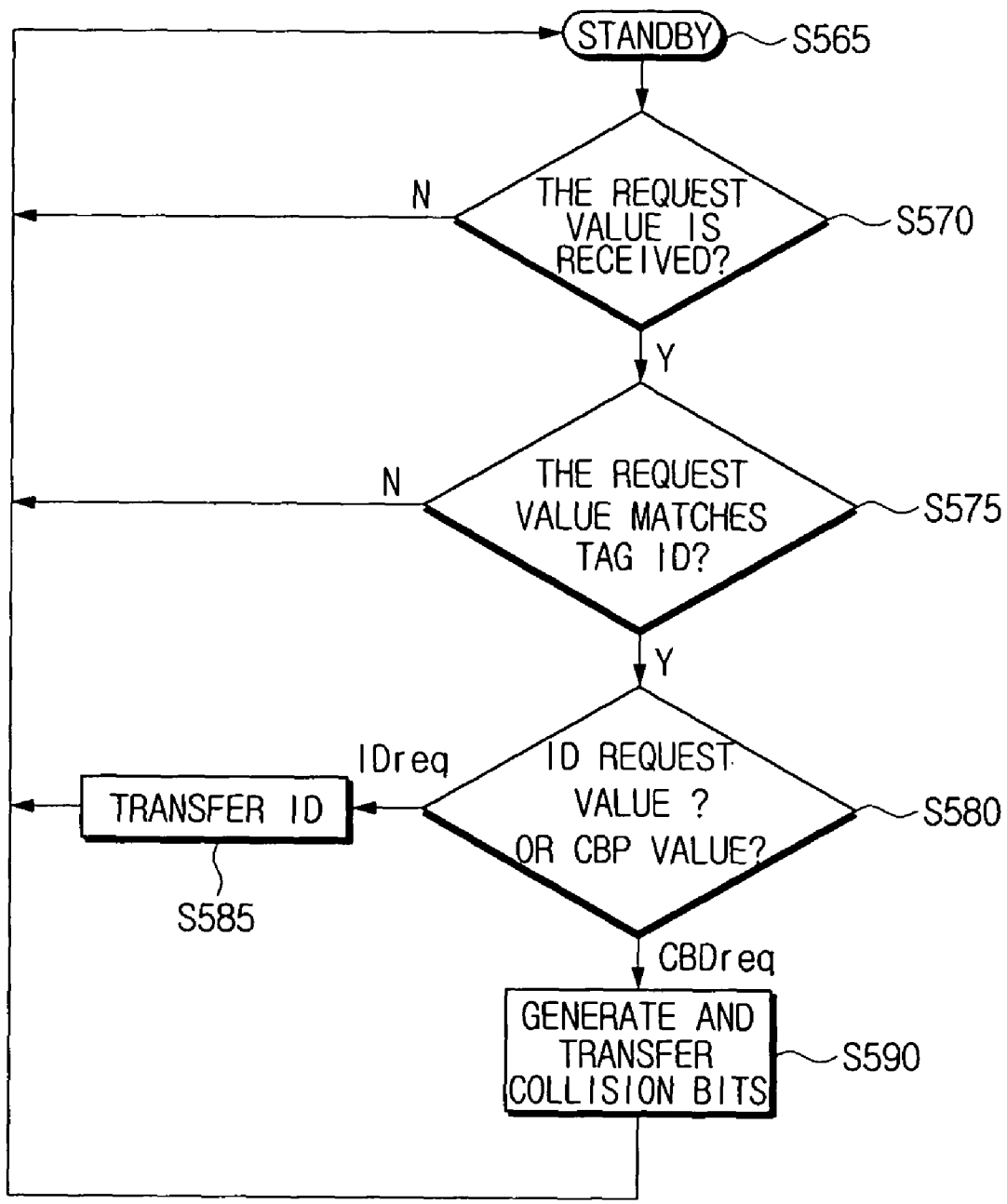
FIG. 3B is a flowchart illustrating an operation of a tag of the RFID system according to an exemplary embodiment of the present invention.

FIG. 3B is a flowchart illustrating an operation of a tag in the RFID system according to an exemplary embodiment of the present invention.

The tag 20 always waits to receive a message from the reader 10 (S565). The tag 20 checks whether an ID request value is received from the reader 10 (S570). When the ID request value is not received, the tag 20 maintains the standby state (S565). By contrast, when the ID request value is received, the tag 20 checks whether the received ID request value matches its tag ID (S575).

When the received ID request value does not match its tag ID, the tag 20 maintains the standby state (S565). When the received ID request value matches its tag ID, the tag 20 checks whether the ID request value is received alone or together with the BDP value (S580).

When only the ID request value is received, the tag 20 transfers its ID to the reader ID (S585). When both the ID request value and the BDP value are received, the tag 20 generates a CBDreq and transfers the generated BCD value with the maximum bits within the preset number of transmittable collision bits (S590). Next, the tag 20 returns to the standby state (S565).

Figure 4:
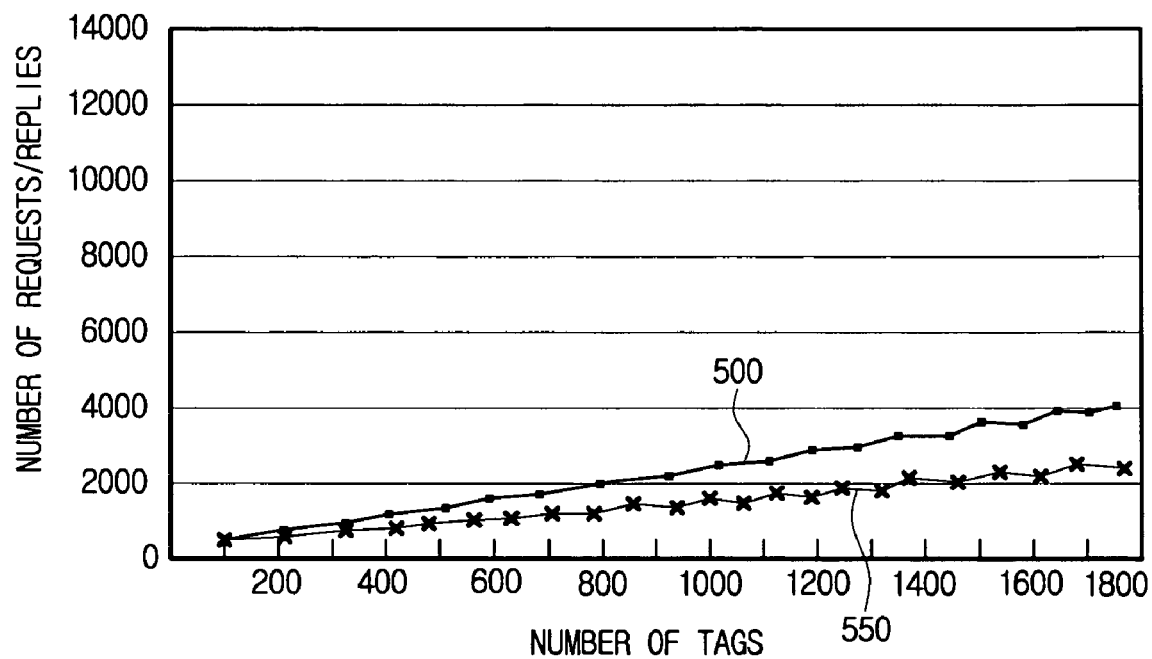
FIG. 4 is a graph comparing experimental results of the anti-collision method between the related art and the present invention.

FIG. 4 depicts a graph comparing experimental results of the anti-collision method between the related art and the present invention.

In FIG. 4, experiments have been conducted by using 96-bit IDs and setting the number of bits of the transmittable BCD value to 6. As the number of tags increases, the number of requests and replies also increases linearly. Meanwhile, it can be seen that the slope relating to the increase of the number of requests and replies 500 of the related art and replies is less than the slope relating to the increase of the number of requests and replies 550 of the present invention.

It is noted that the present invention drastically reduces the number of requests and replies with respect to the increasing number of tags, comparing with the related art.

Figure 5:
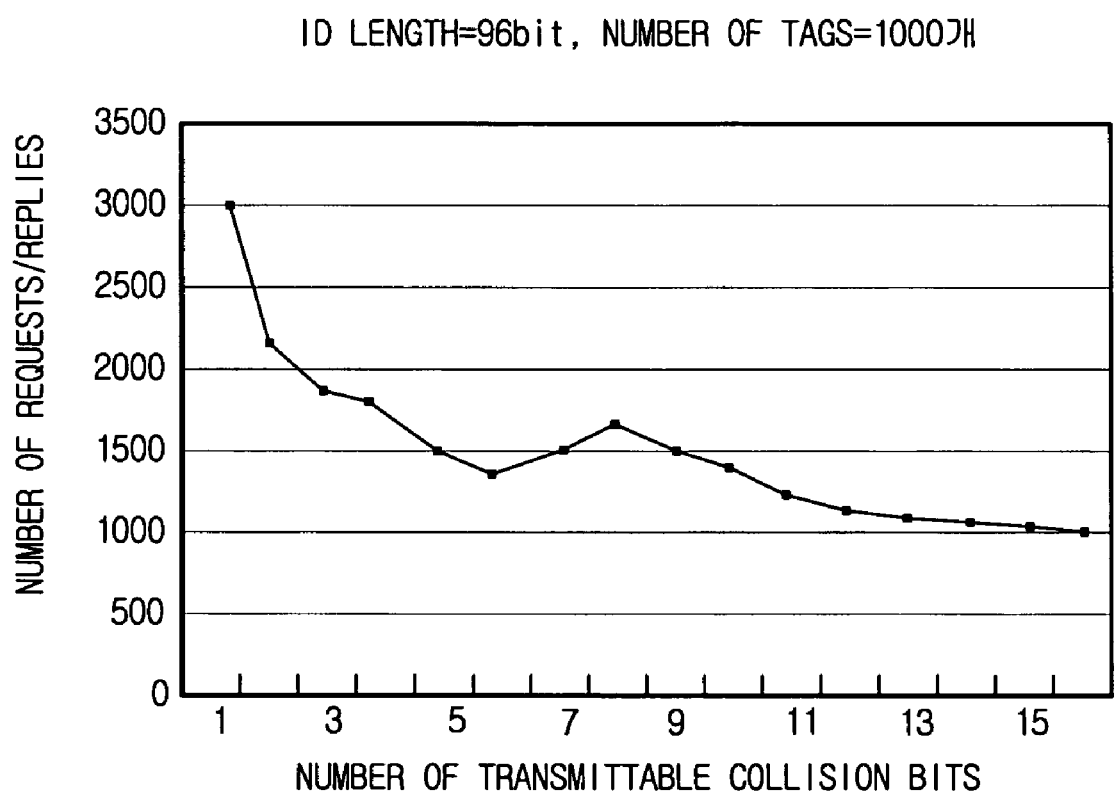
FIG. 5 is a graph of another experimental results of the anti-collision method of the present invention.

FIG. 5 depicts a graph of another experimental results of the anti-collision method of the present invention.

In FIG. 5, experiments have been conducted by using 96-bit IDs and setting the number of tags to 1,000. The number of requests and replies between the reader and the tags is measured while the number of bits of the CBDreq to be transferred from the tags is increased from 1 to 17. As a result, the minimum number of requests and replies is obtained when the number of bits of the CBDreq is set to 6. It can be seen that the most efficient implementation of the present invention is to set the number of bits of the CBDreq transferred from the tag to 6 when the 96-bit IDs are adapted.

As set forth above, the reader 10 generates and transfers the CBP value which indicates the collision spots, and the respective tags 20 generates CBDreq with respect to the collision bits only and transfers the generated CBDreq. Therefore, patterns of collision ID bits are recognized without suffering collision. Because a plurality of IDs can be identified at one time, the number of messages transferred between the reader 10 and the tags 20 can be reduced. Additionally, because the CBDreq is shorter than an ID, power consumption for the transfer can be reduced. As a result, the time and power efficiencies of the RFID system can be improved.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An anti-collision method of a radio frequency identification (RFID) system comprising a reader, and a plurality of tags each having a corresponding identification (ID), the anti-collision method comprising:
    transmitting an ID request value from the reader to the plurality of tags, the ID request value containing at least one code forming identifications (IDs) of the plurality of tags;
    receiving the IDs from the plurality of tags which contains the ID request value, each entire ID of the IDs being transmitted from a corresponding tag of the plurality of tags in response to the single ID request value transmitted from the reader, wherein the ID request value is transmitted to the plurality of tags before the IDs are received from the plurality of tags;
    if at least two of the received IDs collide, generating a collision bit position (CBP) value indicating bit position of collision of the collided IDs by using the collided IDs, and transmitting the ID request value and the generated collision bit position (CBP) value to each of tags of the plurality of tags that have transmitted the collided IDs;

receiving values representing collision bits of the collided IDs from the tags that have transmitted the collided IDs in response to the transmitted ID request value and collision bit position (CBP) value; and identifying IDs of the tags that have transmitted the collided IDs based on the values representing the collision bits of the collided IDs received from the tags that have transmitted the collided IDs.

2. The anti-collision method of claim 1, wherein each of the IDs of the plurality if tags comprises a binary bit, and the ID request value comprises '0' or '1'.

3. The anti-collision method of claim 2, wherein if at least two of the received IDs collide with each other, the reader recognizes the bit position of collision of the IDs based on a code other than the binary bit.

4. The anti-collision method of claim 1, wherein the receiving the values representing the bit position of collision of the IDs from the tags comprises receiving from each of the tags that have transmitted the collision IDs a collision bit determination request (CBDreq), which is a set of consecutive bits representing the bit position of collision of the collided IDs of the tags that have transmitted the collided IDs.

5. The anti-collision method of claim 4, wherein each of the tags that have transmitted the collided IDs generate the CBDreq by converting bits representing the bit position of collision of the collided IDs to a decimal unit and generating a binary code which indicates a bit position corresponding to the converted decimal value.

6. The anti-collision method of claim 4, wherein the CBDreq is received as many as a predetermined number of codes.

7. The anti-collision method of claim 4, wherein the identifying the IDs comprises inserting bits of the CBDreq in sequence into the bit position of collision of the collided IDs if a number of bits of the CBDreq is equal to or smaller than a predetermined number of bits.

8. The anti-collision method of claim 4, wherein the identifying the IDs comprises:
generating an estimate ID by inserting bits the CBDreq in sequence into the bit position of collision if a number of bits of the CBDreq is greater than the predetermined number of bits; and
transmitting the estimate ID to the tags that have transmitted the collided IDs as the ID request value.

9. The anti-collision method of claim 8, further comprising confirming an ID if the estimate ID as the ID request value does not have any collision.

10. The anti-collision method of claim 8, further comprising, if the estimate ID as the ID request value has a collision, re-generating the CBP value with respect to the bit position of collision and transmitting the re-generated CBP value and the estimate ID to a colliding tag.

11. A radio frequency identification (RFID) system comprising:
a plurality of tags, wherein each of the plurality if tags has an identification (ID); and
a reader which transmits to the plurality of tags an ID request value which contains at least one code forming identifications (IDs) of the plurality of tags;

wherein each of the plurality of tags provides its respective entire ID to reader in response to the single ID request value transmitted from the reader, and the reader transmits the ID request value to the plurality of tags before receiving the IDs from the plurality of tags, wherein if at least two of the provided IDs collide, the reader generates a collision bit position (CBP) value indicating bit position of collision of the collided IDs by using the collided IDs, and transmits the ID requests a value and the generated collision bit position (CBP) value to each of tags of the plurality of tags that have provided the collided IDs, and wherein the reader receives values representing collision bits of the collided IDs from the tags that have provided the collided IDs in response to the ID request value and the generated collision bit position (CBP) values and identifies IDs of the tags that have provided the collided IDs based on the received values representing the collision bits of the collided IDs.

12. The RFID system of claim 11, wherein each of the IDs of the plurality if IDs comprises a binary bit, and the ID request value comprises '0' or '1'.

13. The RFID system of claim 12, wherein if at least two of the IDs collide, the reader recognizes the bit position of collision based on a code other than the binary bit.

14. The RFID system of claim 11, wherein each of the tags that have provided the at least two collided IDs generates the value representing the bit position of collision of the IDs by generating a collision bit determination request (CBDreq) which is a set of consecutive bits representing the bit position of collision of collided the IDs.

15. The RFID system of claim 14, wherein each of the tags that have provided the collided IDs converts bits representing the bit position of collision of the collided IDs into a decimal unit, and generates a collision bit determination request (CBDreq) which is a binary data representing the position of the decimal value with '0' or '1'.

16. The RFID system of claim 14, wherein each of the tags that have provided the collided IDs transmitted the CBDreq as many as a predetermined number of codes.

17. The RFID system of claim 14, wherein if the CBDreq is equal to or smaller than a predetermined number of codes, the reader identifies the IDs of the tags that have provide the collided IDs by inserting bits of the CBDreq in sequence into the bit position of collision of the collided IDs.

18. The RFID system of claim 17, wherein if the CBDreq is greater than the predetermined number of bits, the reader generates an estimate ID by inserting the bits of the CBDreq in sequence into the bit position of collision, and transmits to each of the tags that have provided the collided IDs the estimate ID as the ID request value.

19. The RFID system of claim 18, wherein if the estimate ID as the ID request value does not have any collision, the reader confirms the estimate ID.

20. The RFID system of claim 18, wherein the estimate ID as the ID request value has the collision, the reader re-generates the CBP value with respect to the bit position of collision, and transmits the re-generated CBP value to a colliding tag.

* * * * *